United States Patent [19]

DeMarco

[11] 4,411,172
[45] Oct. 25, 1983

[54] VARIABLE SPEED REDUCING AND TORQUE TRANSMITTING SYSTEM

[75] Inventor: Michael DeMarco, Middletown, R.I.

[73] Assignee: The United States of America as represented by the Secretary of the Navy, Washington, D.C.

[21] Appl. No.: 236,478

[22] Filed: Feb. 20, 1981

[51] Int. Cl.³ .................................... F16H 37/06
[52] U.S. Cl. .................................. 74/690; 74/796
[58] Field of Search ............ 74/796, 798, 755, 772, 74/690

[56] References Cited

U.S. PATENT DOCUMENTS

| Re. 18,175 | 9/1931 | Erban | 74/798 |
|---|---|---|---|
| 2,860,518 | 11/1958 | Andrews | 74/200 |
| 2,974,547 | 3/1961 | Egan | 74/796 |
| 3,246,531 | 10/1961 | Kashihara | 74/200 |
| 3,252,355 | 5/1966 | Hewko | 74/796 |
| 3,285,083 | 7/1964 | Singer | 74/191 |
| 3,293,947 | 7/1964 | Chery | 74/796 |
| 3,410,156 | 6/1964 | Davis | 74/721 |
| 3,452,622 | 1/1968 | Kashihara | 74/796 |
| 3,496,526 | 11/1968 | Rockwell | 340/7 |
| 3,575,127 | 5/1969 | Wislicensus et al. | 115/12 |
| 3,673,881 | 2/1971 | Burke | 74/198 |
| 3,835,806 | 9/1974 | Rice | 115/12 R |

FOREIGN PATENT DOCUMENTS 2333754  1/1975  Fed. Rep. of Germany ........ 74/796

Primary Examiner—Leslie A. Braun
Assistant Examiner—Frank H. McKenzie, Jr.
Attorney, Agent, or Firm—Robert F. Beers; Arthur A. McGill; Prithvi C. Lall

[57] ABSTRACT

Propulsion means of an undersea vehicle comprises a pair of counter-rotating low speed impellers driven from a spider shaft rotating at relatively high speed. The reduction is accomplished by a variable speed reducing and torque transmitting device which allows infinite resolution for speed control including a zero speed setting while maintaining a constant high speed at the input spider shaft. Attitude of the vehicle is controlled by a plurality of regulated inlet ports and roll control is regulated by increasing the speed of one impeller and decreasing the speed of the other. The sea water utilized for the attitude is also used for propulsion. Control systems within the vehicle utilize an electro-pneumatic-hydraulic system complex.

3 Claims, 6 Drawing Figures

VARIABLE SPEED REDUCING AND TORQUE TRANSMITTING SYSTEM

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention generally relates to the propulsion and control systems of a torpedo.

These systems in one prior art device have several disadvantages. These include sluggish speed control that results in speed variations at alternate depths and speed variability from one system to the other. These are sources of error in fire control. Another disadvantage is that the propelling force is supplied by one rotating impeller only. Although its reactional torque is counteracted by a stator in the shroud, the relationship is fixed and subject to change with changing modes of weapon such as speed, depth, climb, dive, etc., which induce conditions of instability in the roll control mechanisms. A further problem is that the weapon must have stabilizing fins. The positioning of these fins induces additional hydraulic drag into the system. This creates a source of power drain and a form of masking of the free flow of seawater. Another device has poor speed, depth and endurance capabilities.

By comparison with these two representative weapons a main objective of this invention is to provide a weapon which will run quietly and effectively while being light and relatively inexpensive.

SUMMARY OF THE INVENTION

It is a general object of the present invention to provide improved systems for propelling and controlling a torpedo. It is a further object to utilize most or all of the power generated by the prime mover to propel the torpedo in normal level flight without taxing the primary power plant during periods of acceleration, during climbing maneuvers and during periods of excessive demand for auxiliary power. These and other objects of the invention and various features and details of construction and operation will become apparent from the specification and drawings.

These are accomplished in accordance with the present invention by providing a variable speed reducing and torque transmitting device. The system includes a D.C. motor that drives a pair of counter-rotating impellers through variable speed members. The rotational velocity of each impeller is altered by a control system that includes the positioning of a speed member by an associated piston. The rotational velocity of the impellers is a function of the positioning of the speed members and the speed ratioing techniques that apply is that of a simulated epicyclic gear train.

An electro-pneumatic-hydraulic system complex provides control for the counter-rotating impellers, a roll control system and a porting system that is actuated by the pitch and azimuth controls.

DESCRIPTION OF THE PREFERRED EMBODIMENTS

Figure 1:
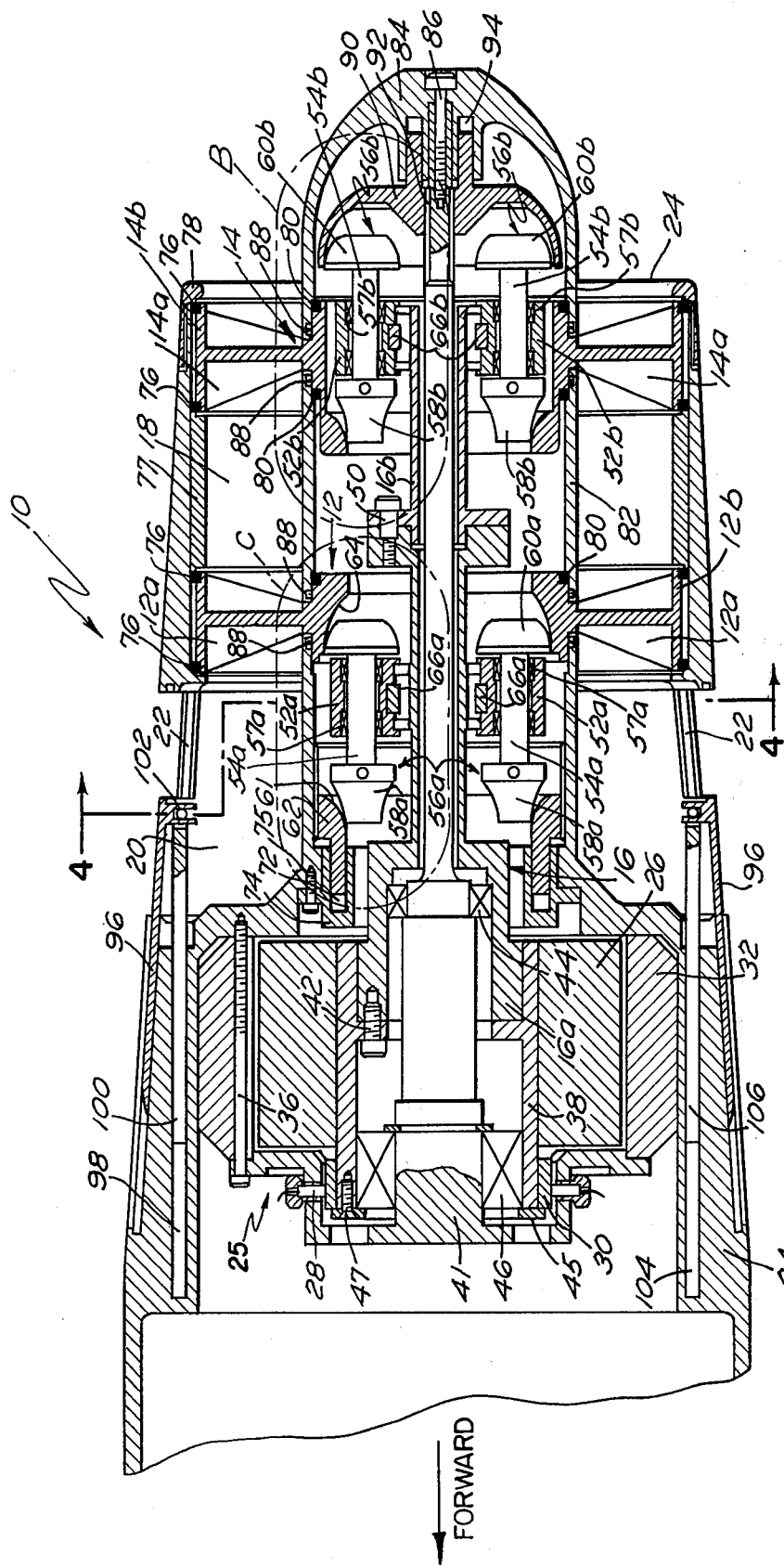
FIG. 1 is a sectional view of a torpedo power train in accordance with the present invention.

Referring now to FIGS. 1-4, inclusive, there is shown a torpedo power train 10. The train 10 includes two counter-rotating low speed impellers 12 and 14 having respective blades 12a and 14a and respective outside radial pieces 12b and 14b. The impellers 12 and 14 are driven from a spider shaft 16 rotating at a relatively high speed. The reduction is accomplished by a novel mechanism allowing reduction ratios throughout a full range of output speeds, including zero setting, while maintaining a constant high speed at the input spider shaft 16. Being gearless, the transmission is quiet, while allowing infinite resolution of the necessary speed adjustments. The two impellers 12 and 14 are sufficiently separated to allow turbulence of the seawater 18 between them to settle out and stabilize. The water, allowed to enter the propulsion chamber 20 through four regulated ports 22 is then jettisoned at opening 24 under the propelling force of acceleration imparted by the impellers 12 and 14.

There are no stabilizing fins required. Weapon attitude is regulated by four inlet ports 22. The principle involves increasing the opening of one while decreasing the opposite one in order to effect a dive or climb, or a right or left turn. The speed of the weapon is regulated by increasing or decreasing the speed ratio of the impellers 12 and 14 in unison, whereas roll control is adjusted by increasing the speed of one impeller while decreasing the other. All of these controls can be monitored on a continuous basis by an electro-pneumatic-hydraulic servo system. The description and operation of the system will be fully described in conjunction with FIGS. 5 and 6 which show the associated electro-pneumatic-hydraulic control systems.

Refer again to FIGS. 1-4, inclusive, for the mechanically and hydraulically actuated linkages along with associated stationary and moving hardware.

A motor 25 has rotating armature 26 that receives D.C. current from a battery pack (not shown) through brushes 28 and abutting commutator 30. The stator field 32 is fixed to housing 34 by means of screws 36. An insert 38 is permanently attached to the rotating armature 26. The insert 38 is also firmly coupled to a spider shaft 16 by means of shoulder screws 42. The spider shaft 16 is comprised of a first spider member 16a and a second spider member 16b. In operation, the armature 26, insert 38 and spider shaft 16 all rotate at armature speed and are supported by a central fixed shaft 41 through first and second sets of ball bearings 44 and 46, respectively. Ball bearings 44 and 46 are retained by ring 45 and flathead screws 47. The second spider member 16b is firmly coupled to the first spider member 16a by means of shoulder screws 50.

Figures 2, 3:
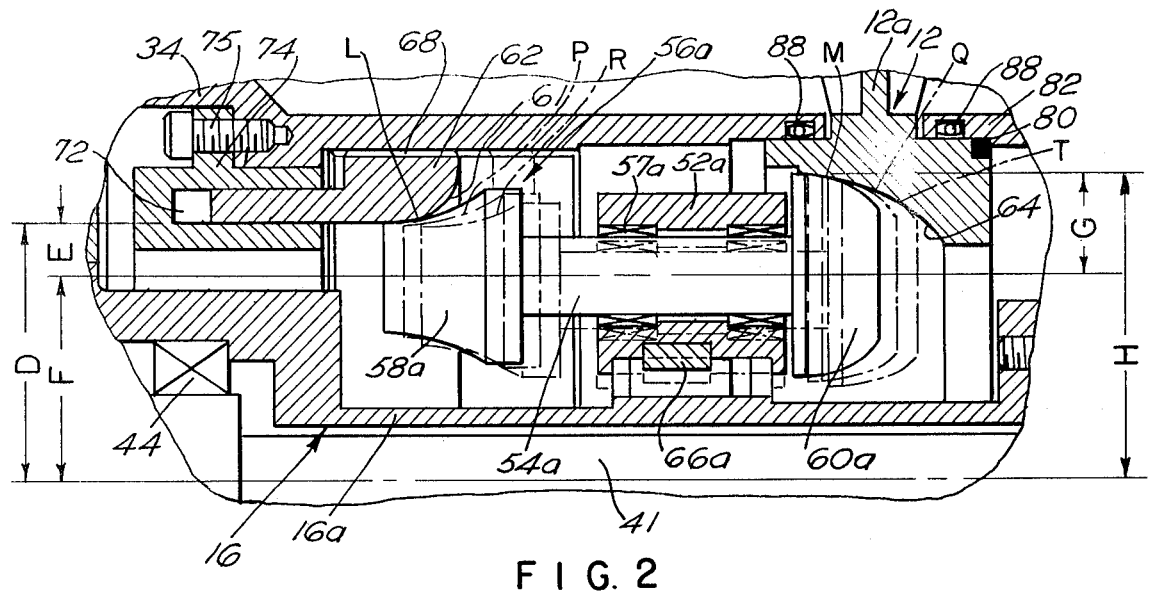
FIG. 2 is an enlarged sectional view of the reverse speed reductor forward impeller of FIG. 1.
FIG. 3 is an enlarged sectional view of the forward speed reductor aft impeller of FIG. 1.
Figure 4:
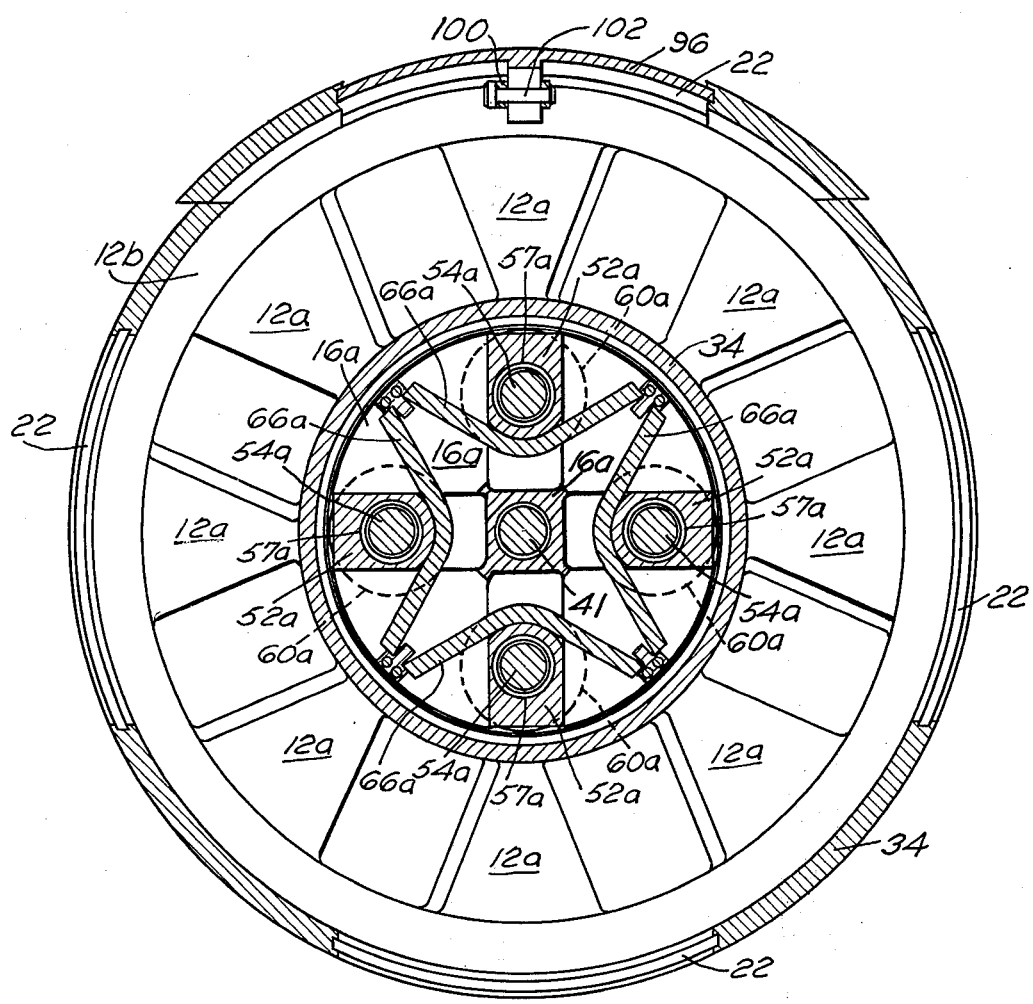
FIG. 4 is a cross-sectional view along the line 4—4 of FIG. 1.

Each of the spider members 16a and 16b rotate at motor armature 26 speed, and each drive four satellites. The four forward satellites are designated 52a and the four rearward satellites 52b. Several components only show upper and lower members such as the rearward satellites 52b. It is readily observable that in addition there are port and starboard members. FIG. 1 shows upper and lower satellites 52a and 52b. FIG. 2 shows upper satellite 52a. FIG. 3 shows upper satellite 52b whereas FIG. 4 shows all four satellites 52a which includes port and starboard satellites as well as upper and lower. The satellites 52a and 52b support respective shafts 54a and 54b of interim variable speed members 56a and 56b by means of needle bearings 57a and 57b. The interim variable speed members 56a and 56b further include respective concave pieces 58a and 58b, and respective convex pieces 60a and 60b at opposing ends of shafts 54a and 54b. Concave pieces 58a are each held in contact with a convex portion 61 of a piston 62 and convex pieces 60a are each in contact with a concave surface 64 of impeller 12. The abutting surfaces are all of a predetermined radius. Leaf springs 66a support respective satellites 52a providing an outward force on the variable speed members 56a. In addition to the outgoing force of leaf springs 66a, the pieces 58a and 60a are held in contact with the piston 62 and impeller surface 64, respectively, by the centrifugal force of high speed rotation.

The rotating impellers 12 and 14 are supported by housing 34 through ball bearings 76 positioned by spacer 77 and retained by threaded collar 78. Additional ball bearings 80 allow free rotation of impellers 12 and 14 while imparting support for spacer 82 and end cap 84. End cap 84, retained by screw 86, is also supported and positioned by fixed shaft 41. Dynamic pressure seals 88 provide sealing of the internal components.

For more specific analysis of speed variability characteristics refer to FIG. 2 which shows the area C of FIG. 1. At one end of shaft 54a the concave piece 58a has a slightly larger radius than the abutting convex portion 61 of piston 62. The abutment of concave piece 58a and convex portion 61 takes place at point L establishing the radii E, F and D. At the other end of shaft 54a convex piece 60a has a slightly smaller radius than the abutting concave surface 64 of impeller 12. The abutment of convex piece 60a and concave surface 64 take place at point M establishing the radii G and H.

Hydraulic piston 62 is restrained from rotation by a splined coupling 68 connecting piston 62 to housing 34. The piston 62 is free to move fore and aft by application of hydraulic pressure to piston 62 by means of pressurized fluid flowing into the cavity 72 of cylinder 74. The cylinder 74 is fixed to housing 34 by means of capscrews 75. An increase in hydraulic pressure moves the piston 62 in the aft direction. Moving the piston 62 moves interim variable speed member 56a, changing the point of contact L to point P or R or interim points and altering the dimensions E, F and D. The interim variable speed member 56a is displaced substantially half as much distance as piston 62. Therefore, point of contact M at the surface of impeller 12 is changed to point Q or T or interim point. The first spider member 16a and associated satellite 52a are rotating at motor speed. Therefore, the output ratio of shaft 54a is regulated by the point of contact L. Since piston 62 is prevented from rotating by spline 68, the speed of impeller 12 will be regulated by the speed of shaft 54a and by the points of contact at opposite ends of speed member 56a. A driving torque will result from the friction force at the point of contact M or Q or T or interim points established by the depression of spring 66a and the centrifugal force due to the high speed of spider member 16a.

To illustrate the speed ratioing capability of the system refer to FIG. 2 with surfaces in contact at points L and M, as shown, establishing dimensions for $D=3\frac{1}{4}''$, $E=\frac{3}{4}''$, $F=2\frac{1}{2}''$, $G=1\frac{1}{4}''$ and $H=3\frac{3}{4}''$. Since the system simulates an epicyclic gear train for which the spider member 16a is equivalent to the arm, the same speed ratioing techniques apply, that is:

|  | ARM | | | | |
|---|---|---|---|---|---|
|  | D(62) | E(58a) | F(52a) | G(60a) | H(12) |
| Rotation-One turn c'wise holding all gears fixed | +1 | +1 | +1 | +1 | +1 |
| Rotation-One turn of fixed gear c'c'wise holding arm fixed | −1 | −D/E | 0 | −D/E | (−D/E)(G/H) |
| Adding we have | 0 | 1 − D/E | 1 | 1 − D/E | 1 − (D/E)(G/H) |

Since F is the input and H is the output, the resulting speed ratio of the impeller will be:

$1 - (D/E)(G/H)$ or $$1 - \frac{(13)(4)(5)(4)}{(4)(3)(4)(15)} = 1 - \frac{13}{9} = 1 - 1.444 = -.444,$$

indicating that the output speed will be 0.444x the input speed, in the opposite direction of rotation because of the minus sign.

On the other hand, if piston 62 is forced aft $\frac{1}{2}$ inch, contact of the surfaces would be altered to the points P and Q resulting in the dimensions $D=3\ 5/16$, $E=27/32$, $F=2\ 15/32$, $G=1\ 3/16$ and $H=3\ 21/32$. Therefore, the output speed ratio will be $1 - (\dot{D}/E)(G/H)$ or $$1 - \frac{(53)(32)(19)(32)}{(16)(27)(16)(117)} = 1 - \frac{(4028)}{3159} = 1 - 1.275 = -.275$$

indicating the output speed will be 0.275x the input speed, in the opposite direction.

Advancing piston 62 another one half inch places the contact points of the radii at R and T resulting in dimensions of $D=3\frac{3}{8}$, $E=1\frac{1}{8}$, $F=2\ 5/16$, $G=1\frac{1}{8}$ and $H=3\frac{3}{8}$, this gives an output speed ratio of 1-(D/E)(G/H) or 1-(8)(9)(8)(27)=1-=0 indicating a zero speed output. For a full one inch travel of piston 62, output speed of impeller 12 ranges from 0.444x the input speed to zero speed in the opposite direction to the input. the resolution of the interim speed changes is infinite. The surfaces involved are hardened and ground similar to the quality found in a ball bearing. Their overall performance simulates the performance of a ball bearing in all respects. Furthermore, torque provided by the friction loads resulting from depression of leaf spring 66a and from the centrifugal force of satellite 52a is sizeable resulting in slight indentation or brinnelling at the contact point. Not only does this increase the amount of surface in contact, resulting in greater friction forces, it produces minute gearlike action which also tends to increase the torque producing quality of the points in contact.

As for the aft speed transmission device of FIG. 3, which is that of area B of FIG. 1, the action differs from that of FIG. 2 in that the orientation of the fixed piston 90 and the impeller 14 are reversed. This has the effect of reversing the direction of the impeller 14. The surfaces at U and V establish dimensions $D=3\frac{3}{4}$, $E=1\frac{1}{4}$. $F=2\frac{1}{2}$, $G=\frac{3}{4}$ and $H=3\frac{1}{4}$. The prior equation still applies, that is:

$$1 - (D/E)(G/H) \text{ or}$$

$$1 - \frac{(14)(4)(3)(4)}{(4)(5)(4)(13)} = 1 - \frac{9}{13} = 1 - .693 = .307$$

indicating that the output speed of impeller 14 will be 0.307x input speed, in the same direction of rotation as input member 16b or in opposite direction to the forward impeller 12.

A piston 90 is retained by a spline 92 to fixed shaft 41. The piston 90 cannot rotate but is free to move fore and aft. Positive hydraulic pressure, applied to the cavity 94, will force piston 90 forward. Advancing the piston 90 one full inch will reduce the speed ratio to zero while allowing for infinite resolution of the speed adjustment in much the same action as piston 62 associated with the forward impeller 12. Here again hydraulic pressure in either direction will force piston 90 fore or aft depending on direction of application but insuring firm driving force at all positions.

The remaining mechanisms that are illustrated in FIGS. 1 and 4 are concerned with side openings 22. During normal level flight of the torpedo, the hatches 96 will be maintained at half mast, allowing each opening 22 to take an equal amounts of seawater in a balanced relationship. However, upon demand of a climb, pressure will be applied to cylinder cavity 98, causing a piston 100 to move aft decreasing the upper opening 22 by means of the linkage at pin 102, whereas reverse hydraulic pressure will be applied to cylinder cavity 104 causing lower piston 106 to move forward increasing the lower opening 22. Since seawater pressure at the upper opening 22 will be increased while decreasing at the lower opening 22, the weapon will be induced into a climb. Reversing the action will cause the torpedo to dive. Similar action at the port and starboard openings 22 will initiate a turn, right or left, providing the necessary means for azimuth control. It is necessary to decrease one opening 22 while increasing the opposing one by an equal amount in order to maintain sufficient and constant flow of seawater to the impellers.

Figure 5:
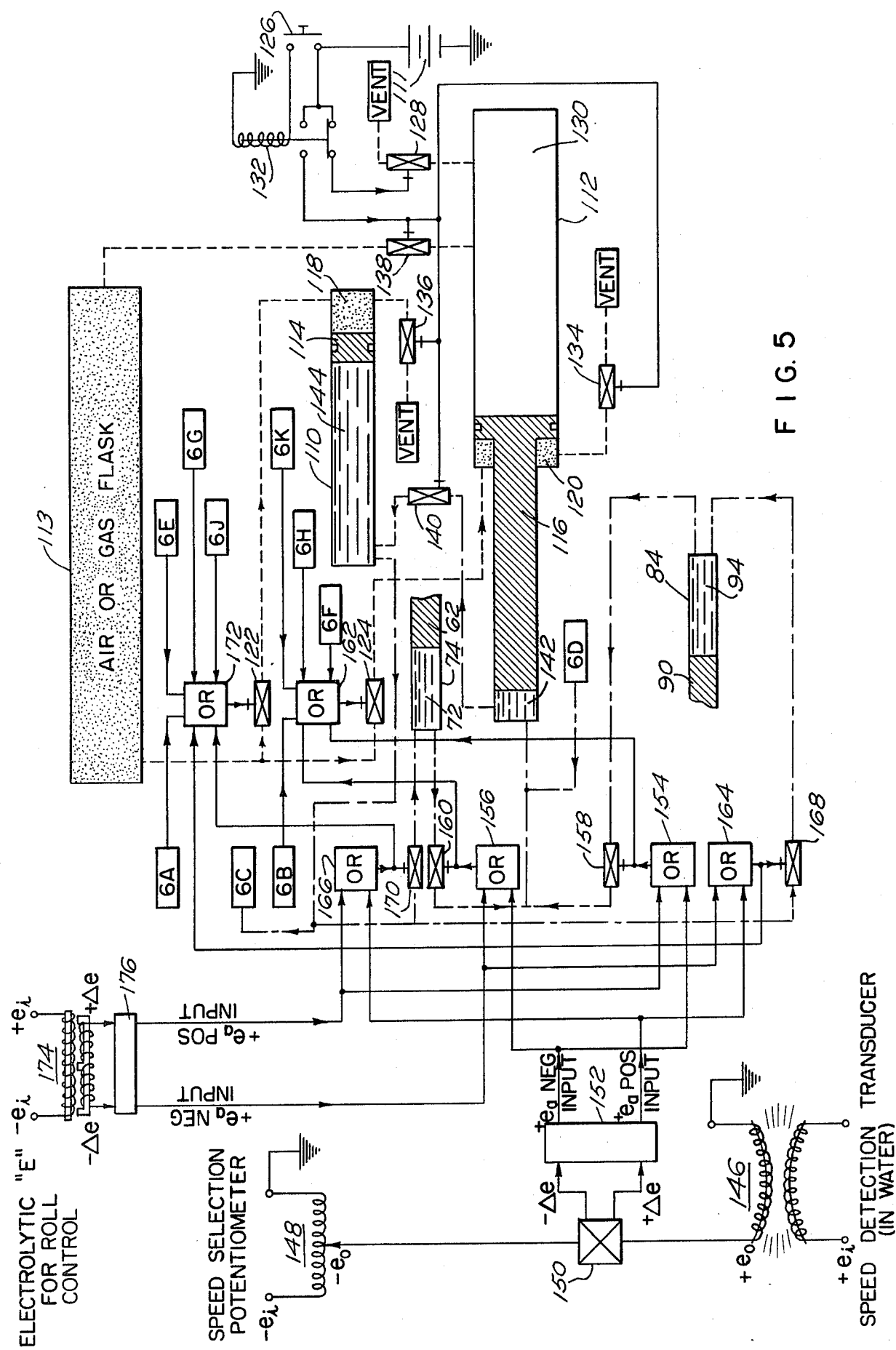
FIGS. 5 and 6 show the control system for the torpedo power train of FIGS. 1-4, inclusive.
Figure 6:
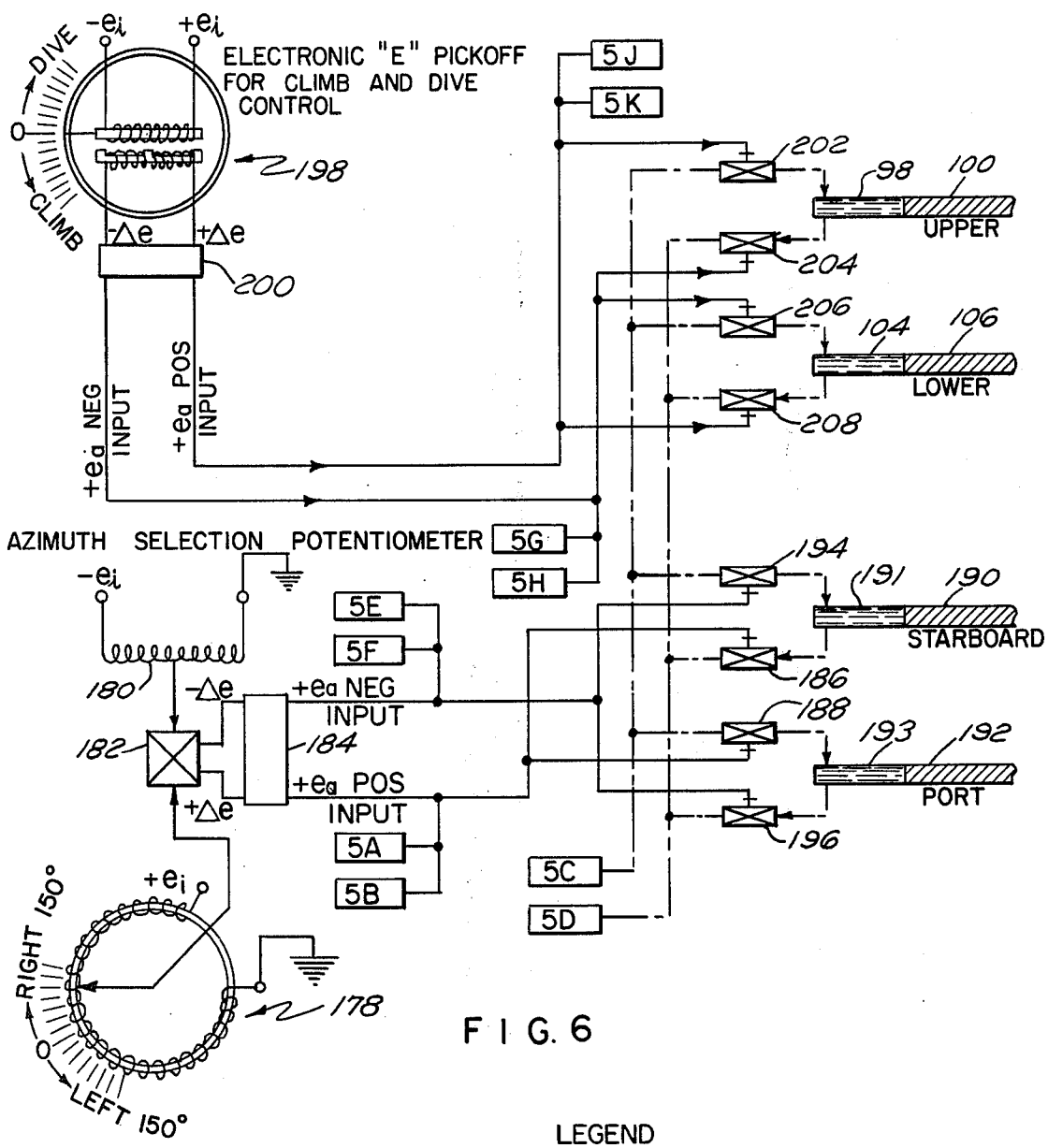

Refer now to FIGS. 5 and 6 for the descriptive and operational features of the electro-pneumatic-hydraulic control system complex. With reference to FIG. 5, the basic hydraulic system complex is shown with phantom lines representing interconnected piping. The hydraulic system is activated by two major hydraulic cylinders 110 and 112. One cylinder 110 supplies positive hydraulic pressure transferring fluid from the cylinder 110 to the hydraulic system. The other cylinder 112 supplies negative hydraulic pressure, where the process is reversed and hydraulic fluid is removed from the system. In order to minimize the loads on the electric plant battery power an air flask 13 is shown as a prime mover for the hydraulic supply system. It supplies activating force to hydraulic pistons 114 and 116 at the cavities 118 and 120 upon demand of hydraulic valves 122 and 124 which are under electronic control. Hydraulic fluid maintained in cylinders 110 and 112 is not directly returnable. For instance, piston 114 delivers fluid to the system but does not remove it; whereas, piston 116 absorbs the fluid with no means for return. However, fluid can be transferred from one cylinder 112 to the other 110 by the action of switch 126. DC supply voltage which normally activates valve 128, maintains an open vent for cavity 130. When switch 126 is depressed, relay 132 is energized from battery 111 resulting in the closing of valve 128 which prevents the venting of cavity 130, while opening valves 134 and 136, venting the respective cavities 120 and 118. In addition, valve 138 is opened pressurizing the cavity 130 from air flask 113. Piston 116 becomes positively pressurized. Relay 132 also opens valve 140 causing hydraulic fluid to flow from cavity 142 and 144 transferring fluid from cylinder 112 to the other cylinder 110. Releasing of switch 126 will again activate valve 128 venting cavity 130 while deactivating valves 134, 136, 138 and 140 restoring the system to operational readiness. Hydraulic cylinders 110 and 112 would normally be large enough to supply fluid for one full torpedo run without necessitating a transfer. Furthermore, air flask 113 must supply sufficient pressure for at least one complete run.

Transducer 146 converts velocity of water flowing through it to a corresponding linear DC voltage, while potentiometer 148 provides a reference DC voltage of opposite polarity, linearly adjustable to represent operating speed values for the weapon. The voltages from transducer 146 and potentiometer 148 are applied to an electronic summer 150. When the outputs of the transducer 146 and potentiometer 148 are equal in magnitude the summer 150 gives a null output. Otherwise a differential error voltage is provided at the output of summer 150. This differential error voltage $\pm \Delta e$ is applied to amplifier 152. Amplifier 152 is a two channel output device wherein one channel outputs upon a negative error input and the second channel outputs upon a positive error input. A $+e_a$ signal is given by whichever channel is conducting. Each channel is isolated from the other. If the error signal is negative, amplifier 152 drives OR gates 154 and 156 opening respective valves 158 and 160 which apply reverse hydraulic pressure to pistons 62 and 90 causing the two impellers 12 and 14, shown in FIG. 1, to increase speed in unison. At the same time, OR gates 154 and 156 drive OR gate 162 opening valve 124 which supplies air pressure from air flask 113 to the cavity 120 of cylinder 112. When the error signal voltage to amplifier 152 become positive the procedure is the same except the application of hydraulic pressure is reversed. In other words, a positive error signal activates the alternate channel of amplifier 152 which drives OR gates 164 and 166 opening respective valves 168 and 170. Positive hydraulic pressure is applied to respective pistons 90 and 62 which has the effect of reducing the speed of the two output impellers 12 and 14 in unison. OR gates 164 and 166 drive OR gate 172 opening valve 122 which passes air pressure from air flask 113 to cavity 118 driving piston 114. Since the performance of the amplifier 152 is to maintain the input error signal at or near zero, transducer 146 monitors the actual in water velocity of the weapon regardless of depth or attitude, whereas the potentiometer 148 selects a desirable speed at which the weapon is to be operating. The selection of speed at potentiometer 148 can be manual or automatic.

Transducer 174 is a typical tilt detection device positioned across the vertical plane. When the weapon rolls counter-clockwise it will output a negative voltage $-\Delta e$, whereas a clockwise roll will induce a positive voltage $+\Delta e$. During normal upright flight, the output remains zero. For a negative input from transducer 174, amplifier 176 being identical to amplifier 152, drives OR gates 156 and 164, which energize respective valves 160 and 168. This applies negative hydraulic pressure to piston 62 and positive hydraulic pressure to piston 90. This decreases the speed of the forward impeller 12 while decreasing the speed of the other impeller 14. Then, for a positive input, amplifier 176 drives OR gates 166 and 154. These energize valves 170 and 158, respectively, increasing the speed of the aft impeller 14 while decreasing the speed of the forward impeller 12. In either case, the tendency is to reright the weapon to a stable upright position resulting in an eventual zero output of transducer 174. In both cases OR gates 162 and 172 are energized opening respective valves 124 and 122, and transferring air pressure from air flask 113 to cavities 120 and 118 to drive pistons 116 and 114.

With reference FIG. 6, transducer 178 is a magnetic north seeking device, free to rotate within a frame, fixed to the torpedo body. The electrical output consists of a DC voltage, linear to the angular relationship between it and the frame. A potentiometer 180 provides a voltage opposite in polarity. An error signal $\Delta e$, either positive or negative results at the output of summer 182. By input of a positive error signal, dual channel amplifier 184 in the same fashion as amplifiers 152 and 176 previously discussed, opens valves 186 and 188. This causes negative hydraulic pressure to be applied to starboard piston 190 increasing the associated hatch 22 opening of FIGS. 1 and 4. Pressure along the starboard side of the weapon will be decreased. At the same time, a positive pressure will be applied to opposing port piston 192 decreasing the associated hatch opening. Pressure along the port side of the weapon is increased. The net result will force the weapon into a left turn. On the other hand, input of a negative error signal at amplifier 184 will open valves 194 and 196, reversing the effects upon starboard and port pistons 190 and 192 resulting in a right hand turning maneuver. In both modes amplifier 184 drives OR gates 162 and 172 of FIG. 5 applying compressed air to main hydraulic cylinders 110 and 112. With the absolute magnitude of the outputs from potentiometer 180 and transducer 178 equal, zero input will appear at amplifier 184, maintaining the weapon in azimuth stability, whereas, the magnitude of the electrical output from potentiometer 180 will specify at what course the weapon must assume. Consistent with control of previously decribed potentiometer 148, potentiometer 180 can also be positioned manually or automatically.

Transducer 198 mounted in the horizontal plane, is a typical tilt detection device similar to transducer 174 of FIG. 5. It is utilized to control the level flight of the torpedo. That is, if the torpedo pitches down, a negative DC output will result; if it pitches up, the output becomes positive; whereas, a zero output signifies stabilized level flight. On the other hand, repositioning the frame of reference up or down by a predetermined amount will force the weapon into a dive or climb equivalent to the angle assumed by the frame. The action of amplifier 200, is exactly similar to the previous discussion for amplifier 184, except the valve items 202, 204, 206 and 208 are involved and upward and downward maneuvers result. By input of a positive error signal dual channel amplifier 200 opens valves 208 and 202. This causes negative hydraulic pressure to be applied to lower piston 106 increasing the associated hatch opening of FIGS. 1 and 4. Pressure along the bottom of the weapon will be decreased. At the same time, a positive pressure will be applied to opposing upper piston 100 decreasing the associated hatch opening. Pressure along the top of the weapon is increased. The net result will force the weapon into a climb. On the other hand, input of a negative error signal at amplifier 200 opens valves 204 and 206, reversing the effects upon upper and lower pistons 100 and 106 resulting in a diving maneuver. In addition, amplifier 200 energizes OR gates 162 and 172 of FIG. 5. This opens respective valves 124 and 122 applying compressed air to main hydraulic cylinders 110 and 112.

There has therefore been described the necessary hardware along with detailed operation features of the system. A new feature is a gearless speed reducing device whose unique design allows for new and novel methods of in water control of a torpedo and for its stabilization during normal level trajectory.

The system has infinite resolution speed adjustments available for both impellers from maximum to zero speed, clockwise or counter-clockwise. This results in a quiet smooth running transmission while allowing the use of a high speed motor.

At zero speed output the motor may be energized to full speed under no load conditions. This requires very little current drain on the batterypack. Full speed can be attained at any time in or out of the water. Peak energy demands upon the power plant would virtually be eliminated since the heavy inertia of the high speed armature shaft would sufficiently maintain shaft speed during post launch acceleration of the impellers, propelling the weapon to full desirable speed and during the execution of in water manueuvers, providing bursts of energy as required. The impellers, solidly supported by ball bearings at their periphery are not sensitive to external vibrations such as dynamic reactions from seawater. Furthermore, the associated gearless speed reduction between the impellers and the prime movers insures the utmost in smooth quiet operation. Weapon speed, gaged by an in water transducer, is regulated by flow velocity only, completely independent of depth or weapon attitude. Speed of the weapon is selectable over a wide range of values having infinite resolution. Besides insuring that it will remain constant, a desired value can be selected to best fit the prevailing tactical situation.

One of the desirable features of the control system is its independence upon auxiliary energy from the primary power plant in addition to its independence upon gyro control that normally requires 400 cycle AC power. All components are DC and powered by the associated batterypack. The only dependence upon external energy is the required charging of the batteries readily accomplished while the weapon is external to the launching tube.

It will be understood that many additional changes in the details, materials, steps and arrangement of parts, which have been herein described and illustrated in order to explain the nature of the invention, may be made by those skilled in the art within the principal and scope of the invention as expressed in the appended claims.

What is claimed is:

1. A variable speed transmission comprising:

driving means adapted to be rotated around a common axis at a rotational velocity, said driving means for driving at said rotational velocity;

a first plurality of satellites with each of said first plurality of satellites arranged in contact with said driving means, each of said first plurality of satellites adapted to be rotated on its own axis by said driving means and to be rotated around said common axis by said driving means at said driving means rotational velocity;

a second plurality of satellites with each of said second plurality of satellites arranged in contact with said driving means, each of said second plurality of satellites adapted to be rotated on its own axis by said driving means and to be rotated around said common axis by said driving means at said driving means rotational velocity;

a first impeller abutting each of said first plurality of satellites in such a manner as to be driven by said first plurality of satellites;

a first speed control means abutting each of said first plurality of satellites; said first speed control means controlling the speed of said first impeller, said first speed control means including a first piston having said common axis, said first piston adapted to be displaced in a direction along said common axis;

each of said first plurality of satellites include a shaft with a concave radius piece at one end and a convex radius piece at the other end, one of said radiused pieces abutting said first piston and the other of said radiused pieces abutting said first impeller;

a second impeller abutting each of said second plurality of satellites in such a manner as to be driven by said second plurality of satellites;

a second speed control means abutting each of said second plurality of satellites; said second speed control means controlling the speed of said second impeller, said second speed control means including a second piston having said common axis, said second piston adapted to be displaced along said common axis;

each of said second plurality of satellites include a shaft with a concave radius piece at one end and a convex radius piece at the other end, one of said radiused pieces abutting said second piston and the other of said radiused pieces abutting said second impeller; and said first and second impellers are arranged to have said common axis and are displaced from each other along said common axis.

2. A variable speed transmission according to claim 1 wherein said driving means further comprises:

a motor having a rotating armature and a stator field;

a spider assembly connected to said motor armature so as to be rotated around said common axis at said rotational velocity, said spider assembly positioned to drive said first and second plurality of satellites; and a shaft fixedly connected to said stator field and supporting said rotating armature and said spider assembly.

3. A variable speed transmission according to claim 2 wherein said first and second impellers abut said respective first and second plurality of satellites in such a manner as to be driven in opposite rotational directions to each other.

* * * * *